No. 759,668. PATENTED MAY 10, 1904.
C. J. CARLSEN.
PLIERS.
APPLICATION FILED SEPT. 15, 1902.
NO MODEL.

Witnesses:
E. H. Elett, Jr.
W. W. Leach.

Inventor:
Charles J. Carlsen.
By George P. Barton
Attorney.

No. 759,668. Patented May 10, 1904.

UNITED STATES PATENT OFFICE.

CHARLES J. CARLSEN, OF CHICAGO, ILLINOIS, ASSIGNOR TO WESTERN ELECTRIC COMPANY, OF CHICAGO, ILLINOIS, A CORPORATION OF ILLINOIS.

PLIERS.

SPECIFICATION forming part of Letters Patent No. 759,668, dated May 10, 1904.

Application filed September 15, 1902. Serial No. 123,408. (No model.)

*To all whom it may concern:*

Be it known that I, CHARLES J. CARLSEN, a citizen of the United States, residing at Chicago, in the county of Cook and State of Illinois, have invented a certain new and useful Improvement in Pliers, of which the following is a full, clear, concise, and exact description.

My invention relates to pliers; and its object is to provide a tool which will be especially adapted for use in repairing spring-jacks and the like in telephone-switchboards.

The parts of telephone-switchboards which require repairs or adjustment are frequently situated in very inaccessible positions, as behind layers of cables and amid a confusion of wires.

It has been my purpose more particularly to provide a tool to be used under such conditions for grasping wires or other small articles so that the object grasped will be held automatically by the pliers without requiring continued attention from the user.

I will describe my invention by reference to the accompanying drawings, which illustrate the preferred embodiment thereof, and in which—

Figure 1:
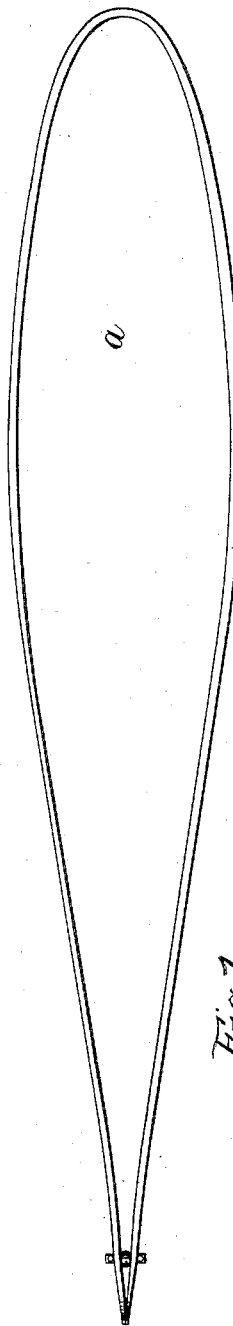
Figure 2:
Figure 3:
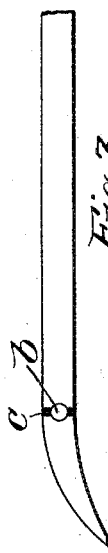
Figure 4:
Figure 5:

Figure 1 is an elevation of my improved pliers. Fig. 2 is a plan view thereof. Fig. 3 is a detail view of the jaws on an enlarged scale. Fig. 4 is a view of the jaws similar to Fig. 1, but on an enlarged scale; and Fig. 5 is a detail view of the link-piece or fulcrum.

Similar letters of reference designate the same parts wherever they are shown.

The pliers are made from a rod of spring metal, such as steel bent, into a loop $a$, with its ends brought together to form the jaws. A pin $b$ passes transversely through the jaws at a point a short distance from their ends, and cross-pins $c$ $c$ are passed through said pin $b$ outside the jaws, whereby said pin forms a link to confine said jaws. The central portion of the pin $b$ is enlarged at $d$, as shown, to form a distance-piece interposed between the jaws, said jaws being thus fulcrumed at the pin $b$. The pliers are self-locking, the jaws being normally held together by the distended spring-loop. Squeezing the two arms of the loop toward each other rocks the jaws upon their fulcrum and causes them to be separated, so that a wire, jack-spring, or the like may be passed between them. Then when the pressure on the spring-loop is removed the loop distends and forces the jaws together to grasp and hold the object.

Having thus described my invention, I claim—

A pliers consisting of a spring-metal rod bent into a loop with its ends brought together to form the jaws, and a fulcrum for the jaws at a point a short distance from their ends, whereby said jaws are normally held together by the distended spring-loop, but may be opened by squeezing the two arms of the loop toward each other.

In witness whereof I hereunto subscribe my name this 9th day of May, A. D. 1902.

CHARLES J. CARLSEN.

Witnesses:
C. L. DE PUE,
W. E. REYNOLDS.